United States Patent
Radhakrishnan et al.

(10) Patent No.: US 12,284,215 B2
(45) Date of Patent: Apr. 22, 2025

(54) SECURITY CONFIGURATION EVALUATION

(71) Applicant: Salesforce, Inc., San Francisco, CA (US)

(72) Inventors: Regunathan Radhakrishnan, San Francisco, CA (US); Vijay Erramilli, San Francisco, CA (US); Anuj Gargeya Malkapuram, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 308 days.

(21) Appl. No.: 17/865,757

(22) Filed: Jul. 15, 2022

(65) Prior Publication Data

US 2024/0022604 A1    Jan. 18, 2024

(51) Int. Cl.
H04L 29/06    (2006.01)
H04L 9/40    (2022.01)

(52) U.S. Cl.
CPC .................... H04L 63/20 (2013.01)

(58) Field of Classification Search
CPC ........................................ H04L 63/20
See application file for complete search history.

(56) References Cited

U.S. PATENT DOCUMENTS

| | | | | |
|---|---|---|---|---|
| 11,483,317 B1 * | 10/2022 | Bolignano | ............ | G06F 21/577 |
| 11,562,089 B2 * | 1/2023 | Levy | ........................ | H04L 9/16 |
| 12,034,698 B2 * | 7/2024 | Smith | ................. | H04L 63/1425 |
| 2010/0095116 A1 * | 4/2010 | He | .......................... | H04L 9/065 |
| | | | | 713/168 |
| 2017/0264640 A1 * | 9/2017 | Narayanaswamy | .. | G06F 16/951 |
| 2019/0102437 A1 * | 4/2019 | Patthak | ............... | G06F 16/2453 |
| 2019/0354726 A1 * | 11/2019 | Critelli | ................ | G06F 11/1004 |
| 2020/0134165 A1 * | 4/2020 | Boodaei | ................ | H04L 63/083 |
| 2022/0393944 A1 * | 12/2022 | Featherstone | ......... | H04W 76/18 |

OTHER PUBLICATIONS

Garg et al; Secure Service Provider Platform for Cloud Environment; vol. 1, Mar. 2020 (Year: 2020).*

* cited by examiner

Primary Examiner — Shawnchoy Rahman
Assistant Examiner — Tre'mia A Johnson
(74) Attorney, Agent, or Firm — Butzel Long

(57) ABSTRACT

Systems, devices, and techniques are disclosed for security configuration evaluation. A binary representation of a reference security configuration for an application may be generated. The binary representation of the reference security configuration for the application may be hashed to generate a reference hash for the application. Data for an instance security configuration for an instance of the application may be received. A binary representation of the instance security configuration may be generated from the received data for the instance security configuration. The binary representation of the instance security configuration may be hashed to generate an instance hash. The computing device may determine the distance between the reference hash and the instance hash. The instance security configuration may be determined to be secure if the distance is not greater than a threshold.

17 Claims, 8 Drawing Sheets

SECURITY CONFIGURATION EVALUATION

BACKGROUND

Each instance of a Software-as-a-Service (SaaS) application may need to have its security settings configured to ensure that the instance is secure. Security settings for a SaaS application may include access privileges and object permissions for users of the SaaS application, password policies, and network access policies. Insecure security configurations for SaaS applications can result data breaches in which data is exposed to the public or to a user who should not have access to the data, for example, due to improperly configured privileges for users and roles. It may be difficult for system administrators to ensure that their instance of a SaaS application is configured securely while still meeting the access requirements of the users of the SaaS application. Checking security configurations to ensure that they are secure may be time consuming due to the large number of settings involved, as an instance of a SaaS application may have large numbers of users and objects, and each user may have a permission for each object. The security configuration for an instance of a SaaS application may also need to be reevaluated regularly to ensure that changes to the settings have not made the security configuration insecure.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
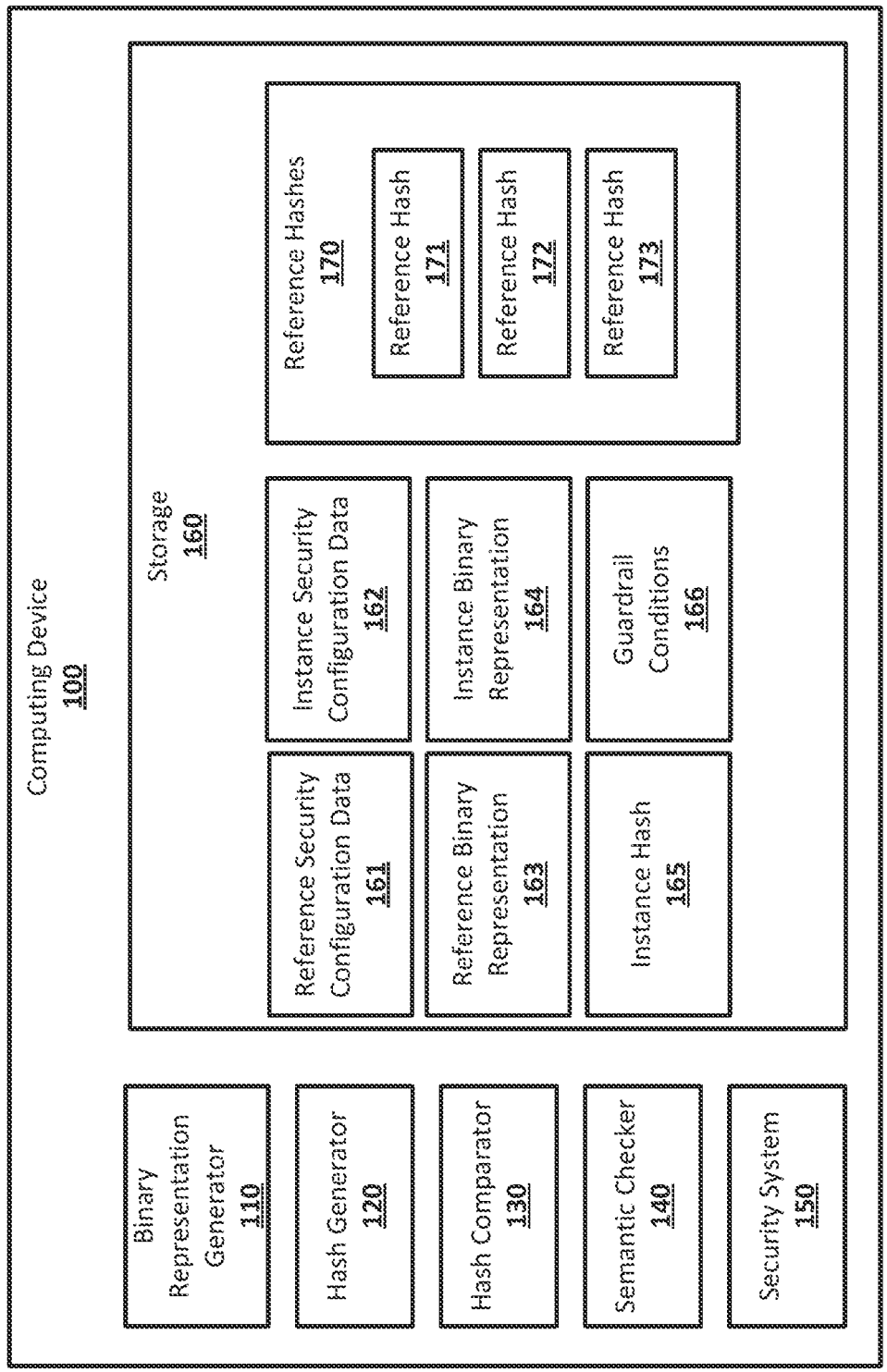
FIG. 1 shows an example system suitable for security configuration evaluation according to an implementation of the disclosed subject matter.

Techniques disclosed herein enable security configuration evaluation, which may allow for security configurations for applications to be evaluated, and insecure configurations to be detected, in an efficient manner. A binary representation of a reference security configuration for an application may be generated. The binary representation of the reference security configuration for the application may be hashed to generate a reference hash for the application. Data for an instance security configuration for an instance of the application may be received. A binary representation of the instance security configuration may be generated from the received data for the instance security configuration. The binary representation of the instance security configuration may be hashed to generate an instance hash. The distance between the reference hash and the instance hash may be determined. The instance security configuration may be determined to be secure if the distance is not greater than a threshold. When the distance is greater than the threshold, a semantic check of the instance security configuration against guardrail conditions may be performed. The semantic check may be determined to indicate that the instance security configuration violates at least one of the guardrail conditions. An organization associated with the instance of the application may be notified that the instance security configuration is insecure and user access to the instance of the application may be suspended for users of the instance of the application.

A binary representation of a reference security configuration for an application may be generated. A reference instance of an application, such as a SaaS application, may be manually configured to have a security configuration that is considered to be secure. This security configuration may serve as a reference security configuration for the application. The reference instance of the application may be set up and configured in any suitable manner, by any suitable party, on any suitable computing device or system, such as, for example, on a server of a cloud computing server system. For example, the reference instance of the application may be set up and configured by an entity, for example, organization, business, or person, that runs the cloud computing server system. A binary representation of the reference security configuration may be generated. The binary representation may be generated in any suitable manner from data for the reference security configuration. For example, the binary representation may be a binary conversion or encoding of a file that stores, or is generated to store, all the settings of the reference security configuration. The binary representation may be generated on a computing device or system that may perform security configuration evaluation.

The binary representation of the reference security configuration for the application may be hashed to generate a reference hash for the application. The binary representation of the reference security configuration may be hashed using any suitable hashing algorithm. For example, MinHash may be used to hash the binary representation of the reference security configuration, and MinHash may itself use any suitable number of any suitable hashing algorithms. The result of hashing the binary representation of the reference security configuration may be a reference hash for the application. The reference hash for the application may be a hash that represents a secure security configuration for the application. The reference hash for the application may be stored, for example, on the computing device or system that generates the reference hash or another computing device or system.

Data for an instance security configuration for an instance of the application may be received. Another instance of the application may have been configured by any suitable entity. For example, the instance of the application may be associated with an entity, such as a business or organization, which may set up the instance or have the instance set up on its behalf. The instance of the application may be, for example, a production instance or sub-production instance of a SaaS application. The instance of the application may be set up on the same computing device or system as the reference instance of the application, for example, on a server of the same cloud computing server system on which the reference instance was set up. The organization or entity associated with the instance of the application may be, for example, a client of the entity that runs the cloud computing system. The data for the instance security configuration for the instance of the application may be received at the computing device or system that performs security configuration evaluation. The data for the instance security configuration may be received in any suitable format and may be in the same format as the data for the reference security configuration.

A binary representation of the instance security configuration may be generated from the received data for the instance security configuration. The binary representation may be generated in the same manner that the binary representation of the reference security configuration was generated, such that if the instance security configuration is identical to the reference security configuration, the binary representations of the instance security configuration will be identical to the binary representation of the reference security configuration. The binary representation of the instance configuration may be generated by the computing device or system that performs security configuration evaluation.

The binary representation of the instance security configuration may be hashed to generate an instance hash. The binary representation of the instance security configuration may be hashed in the same manner that the binary representation of the reference security configuration was hashed. For example, if MinHash was used to hash the binary representation of the reference security configuration, MinHash, with the same hashing algorithms, may also be used to hash the binary representation of the instance security configuration. The result of hashing the binary representation of the instance security configuration may be an instance hash for the instance of the application. The instance hash for an instance of the application may be a hash that represents the current security configuration for that instance of the application. The binary representation of the instance security configuration may be hashed by the computing device or system that performs security configuration evaluation.

The distance between the reference hash and the instance hash may be determined. The distance may be determined in any suitable manner. For example, the distance between the reference hash for the application and the instance hash for the instance of the application may be determined as a Levenshtein distance, Hamming distance or Euclidean distance. The distance may represent a risk score for the instance security configuration, as a higher distance may indicate greater deviation from the reference security configuration and greater risk that the instance security configuration is insecure. The distance between the reference hash and the instance hash may be determined by the computing device or system that performs security configuration evaluation.

The instance security configuration may be determined to be secure if the distance is not greater than a threshold. A threshold distance may be set based on the manner in which the distance between the reference hash and the instance hash is determined. If the distance determined between the reference hash and the instance hash is not greater than the threshold this may indicate that the instance security configuration for the instance of the application is similar enough to the reference security configuration that the instance security configuration, and the instance of the application, may be considered secure.

When the distance is greater than the threshold, a semantic check of the instance security configuration against guardrail conditions may be performed. If the distance determined between the reference hash the instance hash is greater than the threshold this may indicate that that the instance security configuration for the instance of the application is dissimilar enough from the reference security configuration for the application that it may not be secure. The instance security configuration may be subjected to further evaluation based on semantics. A semantic check may be performed on the instance security configuration to check it against guardrail conditions. The guardrail conditions may be conditions that define the minimum requirements that a security configuration for an instance of the application should meet to be considered secure. The guardrail conditions may, for example, be logical predicates that encode the security principals implemented in the reference security configuration. For example, a guardrail condition may specify that guest users may not be given read access to specified data objects, or non-administrator, non-guest users may only be given read access, and not write access, to specified data objects. The semantic check may be performed in any suitable manner, using any suitable semantic checker such as, for example, any suitable Satisfiability Modulo Theories (SMT) solver, and may be performed by the computing device or system that performs security configuration evaluation.

The semantic check may be determined to indicate that the instance security configuration violates one of the guardrail conditions. If the semantic check determines that the instance security configuration does violate one of the guardrail conditions, this may be a negative outcome and may indicate that the instance security configuration is insecure. Otherwise, the outcome of the semantic check may be positive, indicating that the instance security configuration does not violate any of the guardrail conditions, in which case the instance security configuration may be considered secure.

An organization associated with the instance of the application may be notified that the instance security configuration is insecure and user access to the instance of the application may be suspended for users of the instance of the application. The entity, for example, organization, associated with the instance of the application whose instance security configuration is insecure may be notified about the insecurity of the instance security configuration in any suitable manner, such as, for example, through any suitable form of electronic communication. The notification may be, for example, an email, SMS, automated call or push notification. User access to the instance of the application with the insecure instance security configuration may also be suspended. Suspension of access may include any user accounts for the instance of the application, including guest accounts, in order to prevent data breaches. User access may be suspended by, for example, the computing device or system that performs security configuration evaluation. User access may only be restored when the instance security configuration has been modified so that is it secure, which may be determined by, for example, the computing device or system that performs security configuration evaluation in the same manner in which the instance security configuration was determined to be insecure.

Any instance security configuration for any instance of the application may be evaluated by the computing device or system that performs security configuration evaluation in the same manner using the reference hash for the application. This may include instances of the application that are set up on the same computing device or system as the reference instance as well as instances of the application set up on other computing devices or systems, for example, on a different cloud computing server system, so long as the reference security configuration is also secure on that other computing device or system. The reference hash for an application may remain the same until the reference security configuration for the application is updated, at which time an updated binary representation may be generated from the updated reference security configuration and hashed to generate an update reference hash for the application.

Instances of the application may have their respective instance security configurations evaluated on a continual basis. The instance security configurations may be evaluated at, for example, timed intervals, or whenever a change to an instance security configuration is detected. This may ensure that instance security configurations that were previously determined to be secure do not become insecure undetected. The use of hash distance determination before semantic checking may allow for continual evaluation of instance security configurations to be performed without excessive computational costs that would be incurred if a semantics check were performed on every instance security configuration at every evaluation. Fewer semantics checks may be performed due to some instance security configurations being determined to be secure based on hash distance determination, which is computationally cheap, lowering overall computational costs.

Every distinct application may have its own reference hash generated for it. For example, if a cloud computing server system makes twenty different SaaS applications available, twenty different reference hashes, one for each SaaS application, may be generated based on manual configuration of the security configurations for the applications and stored.

FIG. 1 shows an example system for security configuration evaluation according to an implementation of the disclosed subject matter. A computing device 100 may be any suitable computing device, such as, for example, a computer 20 as described in FIG. 6, or component thereof, for security configuration evaluation. The computing device 100 may include a binary representation generator 110, a hash generator 120, a hash comparator 130, a semantic checker 140, a security system 150, and a storage 160. The computing device 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The computing device 100 may be part of a computing system and network infrastructure, or may be otherwise connected to the computing system and network infrastructure, including a larger server network which may include other server systems similar to the computing device 100. The computing device 100 may include any suitable combination of central processing units (CPUs), graphical processing units (GPUs), and tensor processing units (TPUs).

The binary representation generator 110 may be any suitable combination of hardware and software of the computing device 100 for generating a binary representation of a security configuration for an application. For example, the binary representation generator 110 may generate reference binary representation 163 from reference security configuration data 161, which may include data for a reference security configuration for an application. The binary representation generator 110 may generate binary representations in any suitable manner. For example, binary representations may be generated by converting a file including settings for a security configuration into any suitable binary encoding. The binary representation generator 110 may generate binary representations for security configurations for all instances of an application in the same manner that a binary representation was generated for the reference security configuration for that application.

The hash generator 120 may be any suitable combination of hardware and software for hashing a binary representation of a security configuration to generate a hash. For example, the hash generator 120 may generate a reference hash 171 by hashing the reference binary representation 163. The hash generator 120 may generate hashes in any suitable manner. For example, hashes may be generated using MinHash, which may in turn use any suitable hashing algorithms. The hash generator 120 may generate hashes from binary representations for security configurations for all instances of an application in the same manner that a hash was generated from a binary representation of the reference security configuration for that application.

The hash comparator 130 may be any suitable combination of hardware and software for comparing two hashes to determine the distances between the hashes. For example, the hash comparator 130 may determine a distance between the reference hash 171 and an instance hash 165, which may be a hash generated from the instance binary representation 164 by the hash generator 120. The distance determined by the hash generator 120 may be a risk score for the security configuration represented by the instance security configuration data 162, with a higher risk score representing an increased possibility that the security configuration is insecure. For example, if the distance between the instance hash 165 and the reference hash 171 is greater than a threshold, this may indicate that the instance security configuration data 162 may represent an insecure security configuration, and thus the instance of the application using this security configuration may be insecure. If the distance is not greater than the threshold, than the security configuration, and instance of the application that uses the security configuration, may be secure. The hash comparator 130 may determine the distance between two hashes in any suitable manner, including, for example, by determining Levenshtein distance, Euclidean distance or Hamming distance.

The semantic checker 140 may be any suitable combination of hardware and software for performing a semantic check of a security configuration against guardrail conditions. For example, the semantic checker 140 may check the semantics of the security configuration in the instance security configuration data 162 against guardrail conditions 166 to determine if any of the guardrail conditions 166 are violated by the security configuration. The guardrail conditions 166 may be conditions that a security configuration for an instance of application may not violate in order to be considered secure. The conditions in the guardrail conditions 166 may be represented in any suitable manner, including, for example, as logical predicates. The semantic checker 140 may be used to check a security configuration when, for example, the hash comparator 130 has determined that a distance between an instance hash generated from a binary representation of that security configuration and a reference hash is greater than the threshold, indicating that the security configuration is possibly insecure. The semantic checker 140 may perform the semantic check in any suitable manner, and may, for example, be an SMT solver. A security configuration which is found to violate guardrail conditions by the semantic checker 140 may be determined to be insecure, indicating the instance of the application that uses that security configuration is insecure.

The security system 150 may be any suitable combination of hardware and software for performing security actions when a security configuration for an instance of an application is determined to be insecure. For example, the security system 150 may notify an appropriate entity when a security configuration has been determined to be insecure. The notified entity may be notified in any suitable manner, using any suitable form of electronic communication. The security system 150 may, for example, send an email, SMS, or push notification to an entity that set up or is otherwise associated with the instance of the application that is using the security configuration that has been determined to be insecure. The security system 150 may also, for example, suspend user access to the instance of the application that is using the security configuration that has been determined to be insecure, until the security configuration has been changed to become secure.

The storage 160 may be any suitable combination of hardware and software for storing data. The storage 160 may include any suitable combination of volatile and non-volatile storage hardware, and may include components of the computing device 100 and hardware accessible to the computing device 100, for example, through wired and wireless direct or network connections. The storage 160 may store, for example, the reference security configuration data 161, instance security configuration data 162, the reference binary representation 163, the instance binary representation 164, the instance hash 165, the guardrail conditions 166, and references hashes 170, including the reference hash 171, a reference hash 172, and a reference hash 173.

Figure 2:
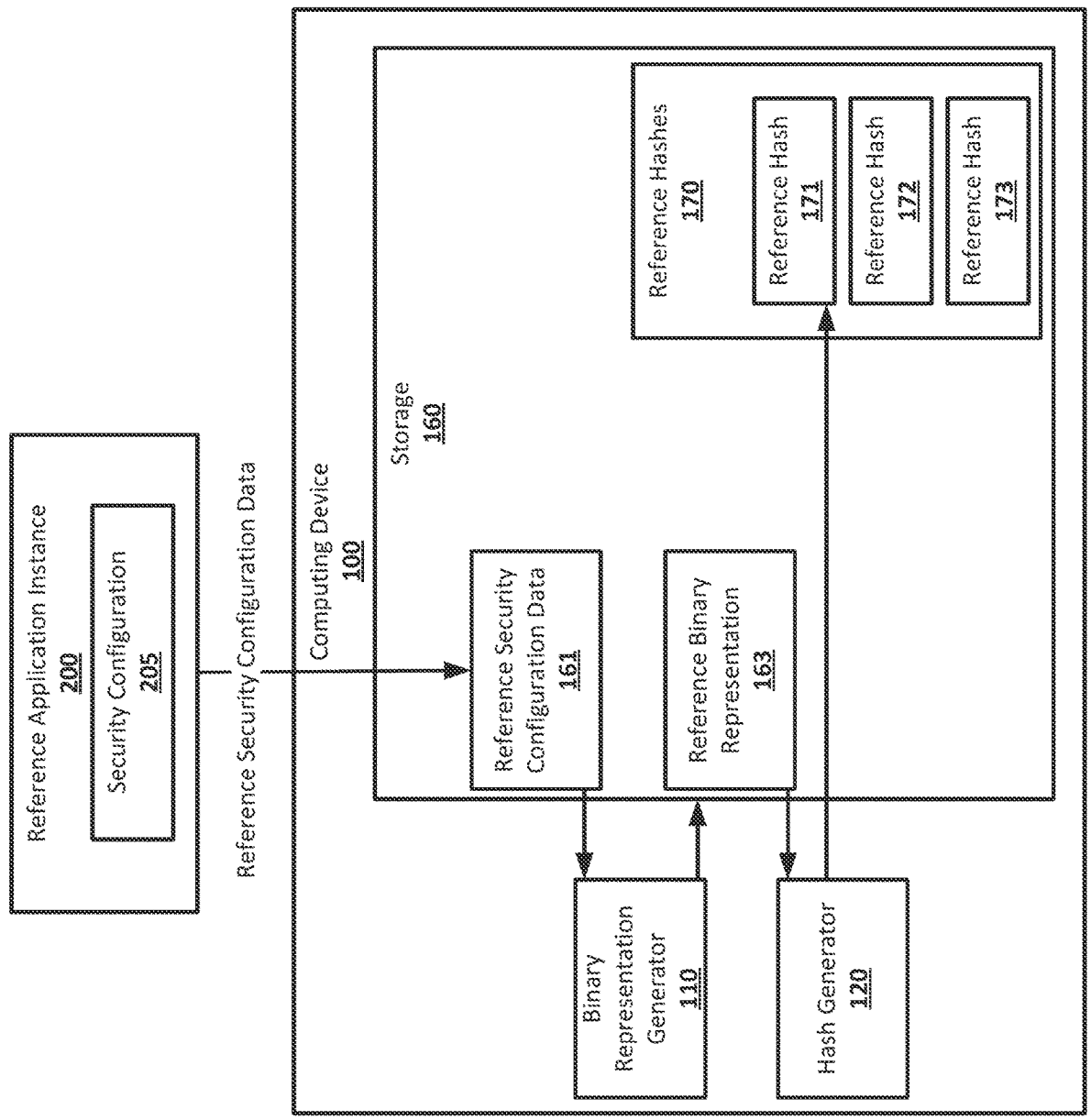
FIG. 2 shows an example arrangement suitable for security configuration evaluation according to an implementation of the disclosed subject matter.

FIG. 2 shows an example arrangement suitable for security configuration evaluation according to an implementation of the disclosed subject matter. A reference application instance 200 may be an instance of an application, for example, a SaaS application, set up on any suitable computing device or system, for example, a cloud computing server system, and configured with a security configuration 205 that may be considered to be secure. The computing device 100 may receive the reference security configuration data 161, which may be data for the settings of the security configuration 205. The reference security configuration data 161 may be received directly from the reference application instance 200, or from any suitable intermediary source, and may be in any suitable format.

The binary representation generator 110 may generate the reference binary representation 163 from the reference security configuration data 161. For example, the binary representation generator 110 may convert or encode the reference security configuration data 161 into any suitable binary format or encoding.

The hash generator 120 may generate the reference hash 171 from the reference binary representation 163. For example, the hash generator 120 may apply any suitable hashing algorithm, such as MinHash, to the reference binary representation 163. The reference hash 171 may be stored with the reference hashes 170. The reference hash 171 may be a representation of the security configuration 205. The reference hash 171 may be used in comparisons with hashes generated from security configurations for other instances of the application that the reference application instance 200 is an instance of in order to evaluate whether those security configurations are secure. The reference hashes 172 and 173 may be, for example, representations of security configurations for two other applications different from the application that the reference application instance 200 is an instance of Any suitable number of reference hashes may be stored in the storage 160 as one of the reference hashes 170. For example, one reference hash may be stored for every unique application available as a SaaS system on a cloud computing server system. The reference hash stored for an application with the reference hashes 170 may be updated whenever the security configuration for the reference application instance of that application is updated. For example, if the security configuration 205 is updated, the reference hash 171 may be updated in the same manner that it was originally generated.

Figure 3A:
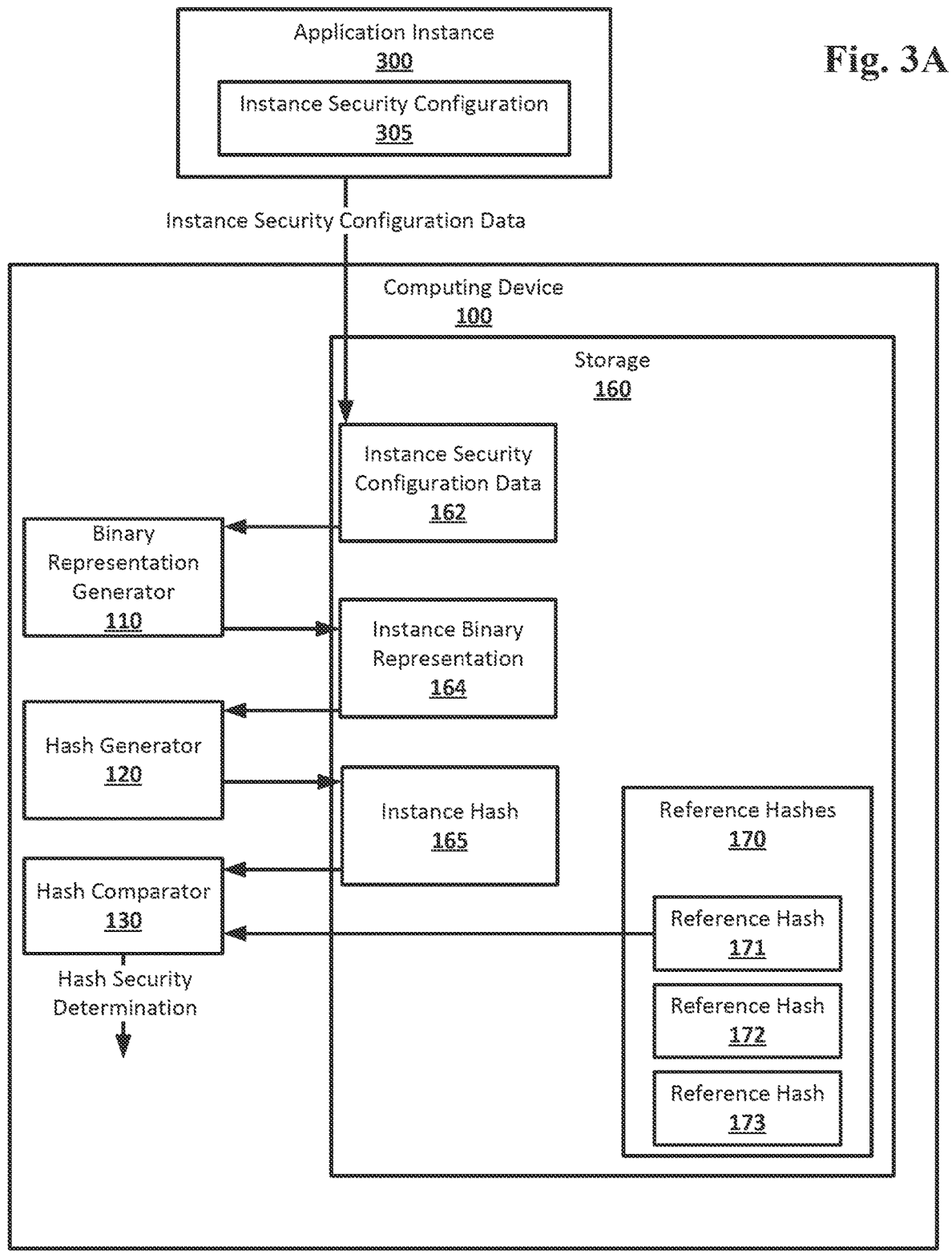
FIG. 3A shows an example arrangement suitable for security configuration evaluation according to an implementation of the disclosed subject matter.

FIG. 3A shows an example arrangement suitable for security configuration evaluation according to an implementation of the disclosed subject matter. An application instance 300 may be an instance of the application, for example, SaaS application, that the reference application instance 200 is an instance of, set up on any suitable computing device or system, for example, a cloud computing server system, and configured with an instance security configuration 305. The computing device 100 may receive the instance security configuration data 162, which may be data for the settings of the instance security configuration 305. The instance security configuration data 162 may be received directly from the reference application instance 200, or from any suitable intermediary source, and may be in the same format as the reference security configuration data 161.

The binary representation generator 110 may generate the instance binary representation 164 from the instance security configuration data 162. The binary representation generator 110 may convert or encode the instance security configuration data 162 into the same binary format or encoding that was used for the reference binary representation 163.

The hash generator 120 may generate the instance hash 165 from the instance binary representation 164. For example, the hash generator 120 may apply the same hashing algorithm, such as MinHash, that was applied to the reference binary representation 163 to the instance binary representation 164. The instance hash 165 may be a representation of the instance security configuration 305.

The hash comparator 130 may compare the instance hash 165 and the reference hash 171 and generate a hash security determination. The hash security determination may be a determination about the security level of the instance security configuration 305 based on the results of a hash comparison. The hash comparator 130 may, for example, determine a distance, for example, Levenshtein distance, Euclidean distance, or Hamming distance, between the instance hash 165 and the reference hash 171, and then determine whether that distance is greater or not greater than a threshold. If the distance between the instance hash 165 and the reference hash 171 is not greater than the threshold, the hash security determination may indicate the instance security configuration 305 is secure, as it may be similar enough to the security configuration 205. No further action may be necessary. If the distance between the instance hash 165 and the reference hash 171 is greater than the threshold, the hash security determination may indicate that further evaluation of the security configuration 205 is needed, for example, through semantic checking. The threshold may be any suitable value, and may be set in any suitable manner, for example, based on the manner in which the distance between hashes is determined and how much an instance hash can deviate from a reference hash while still allowing the instance security configuration to be considered secure.

The hash comparator 130 may only compare instance hashes with reference hashes that are generated from security configurations for instances of the same application. For example, the instance hash 165 may be compared to the reference hash 171 because the reference application instance 200 and the application instance 300 may be instances of the same application, while the reference application instances from whose security configurations the reference hashes 172 and 173 were generated may be instances of other applications.

Figure 3B:
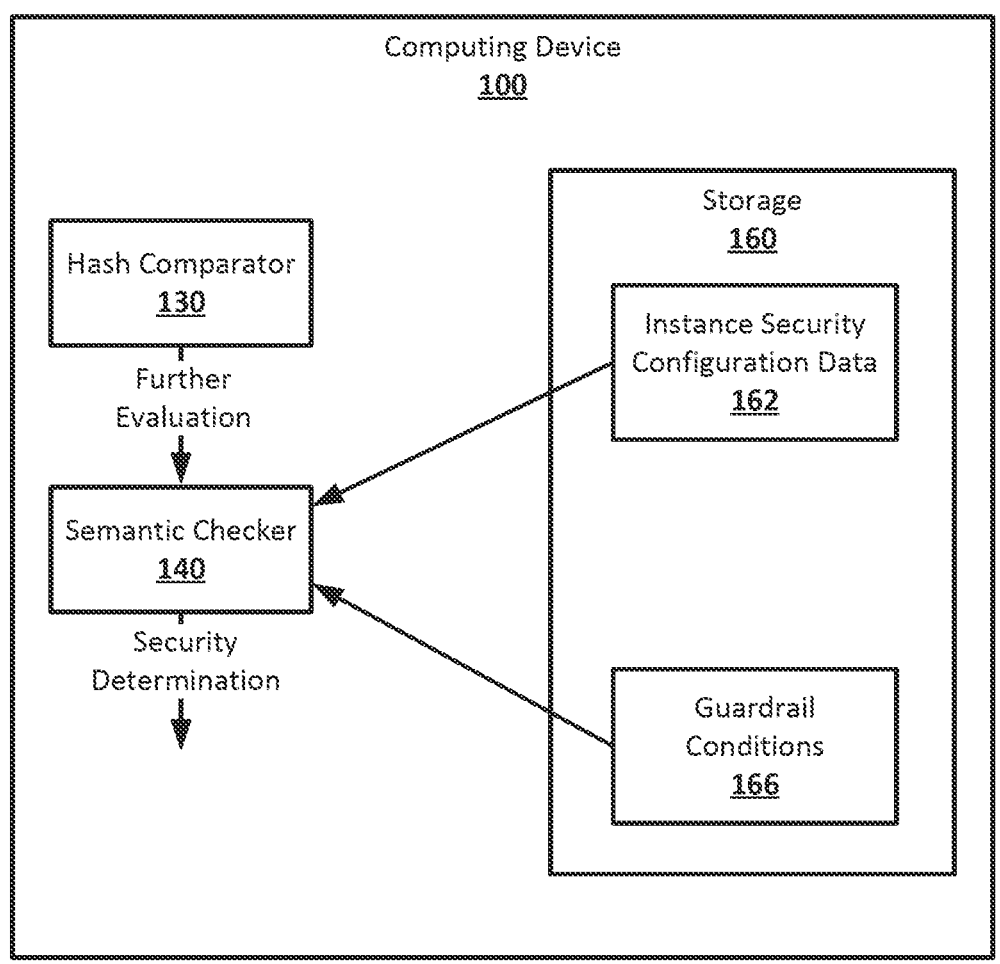
FIG. 3B shows an example arrangement suitable for security configuration evaluation according to an implementation of the disclosed subject matter.

FIG. 3B shows an example arrangement suitable for security configuration evaluation according to an implementation of the disclosed subject matter. When the hash comparator 130 determines that the distance between the instance hash 165 and the reference hash 171 is greater than the threshold, the hash security determination may indicate to the semantic checker 140 that further evaluation of the security configuration 205 is needed. The semantic checker 140 may perform a semantic check of the instance security configuration data 162 against the guardrail conditions 166 to determine if any of the guardrail conditions 166 are violated by the instance security configuration 305. The semantic checker 140 may generate a security determination that may indicate whether the instance security configuration 305 is secure or insecure. If the semantic checker 140 determines, based on the instance security configuration data 162, that the instance security configuration 305 violates any of the guardrail conditions 166, the semantic checker may generate an indication that the instance security configuration 305, and thus the application instance 300, is insecure. Otherwise, if the semantic checker 140 determines that none of the guardrail conditions 166 are violated, the semantic checker 140 may generate an indication that the instance security configuration 305, and thus the application instance 300, is secure. No further action may be needed. The semantic checker 140 may perform the semantic check in any suitable manner, and may, for example, use any suitable SMT solver. The guardrail conditions 166 may be specific to the application of which the reference application instance 200 and application instance 300 are instances, and unique applications may have their own unique sets of guardrails conditions that may be used by the semantic checker 140.

Figure 3C:
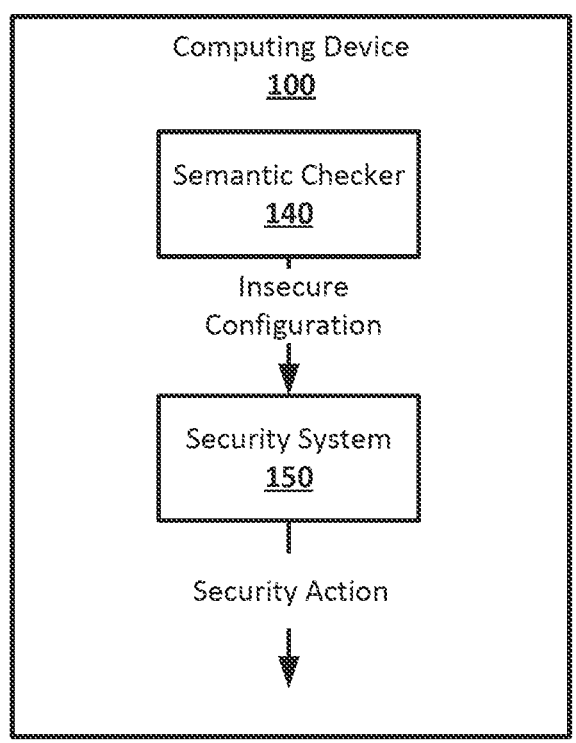
FIG. 3C shows an example arrangement suitable for security configuration evaluation according to an implementation of the disclosed subject matter.

FIG. 3C shows an example arrangement suitable for security configuration evaluation according to an implementation of the disclosed subject matter. When the semantic checker 140 determines, based on the instance security configuration data 162, that the instance security configuration 305 violates any of the guardrail conditions 166, the semantic checker may indicate to the security system 150 that the instance security configuration 305, and thus the application instance 300, is insecure. The security system 150 may then perform any suitable security action based on the determination that the instance security configuration 305 is insecure. The security action taken by the security system 150 may, for example, be the sending of a notification to an entity associated with the application instance 300 indicating that the instance security configuration 305 and application instance 300 are not secure. The security system 150 may send the notification using any suitable form of electronic communication. The security action taken by the security system 150 may also be suspending user access to the application instance 300. This may prevent data breaches or other exploitation of the insecurity of the instance security configuration 305. User access may be suspended until the instance security configuration 305 has been updated and is determined to be secure, for example, by the hash comparator 130 or semantic checker 140, at which time the security system 150 may restore user access to the application instance 300.

Figure 4:
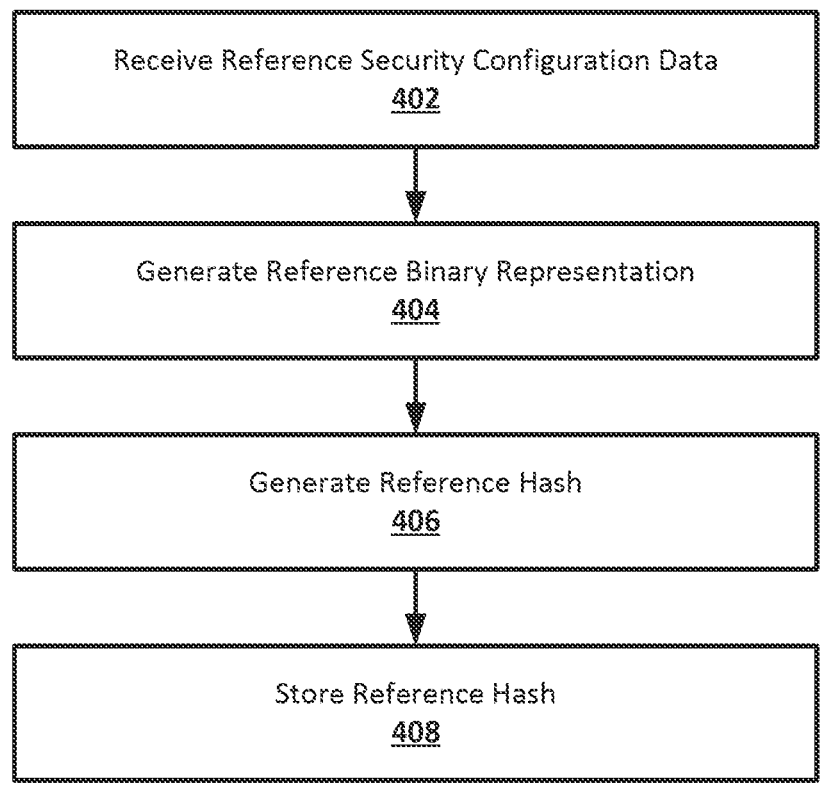
FIG. 4 shows an example procedure suitable for security configuration evaluation according to an implementation of the disclosed subject matter.

FIG. 4 shows an example procedure suitable for security configuration evaluation according to an implementation of the disclosed subject matter. At 402, reference security configuration data may be received. For example, data including the settings of the security configuration 205 may be received at the computing device 100 and stored as reference security configuration data 161. The security configuration 205 may be a secure security configuration for an application of which the reference application instance 200 is an instance. The settings included in the reference security configuration data 161 may include, for example, user and object permissions for the reference application instance 200.

At 404, a reference binary representation may be generated. For example, the binary representation generator 110 may generate the reference binary representation 163 from the reference security configuration data 161. The reference binary representation 163 may be generated in any suitable manner, using any suitable binary conversion or encoding of the reference security configuration data 161.

At 406, a reference hash may be generated. For example, the hash generator 120 may generate the reference hash 171 from the reference binary representation 163. The reference hash 171 may be generated in any suitable manner, using any suitable hashing algorithm. For example, MinHash may be used to generate the reference hash 171 from the reference binary representation 163.

At 408, the reference hash may be stored. For example, the reference hash 171 may be stored along with the reference hashes 170. The reference hash 171 may be used to evaluate the security configurations of other instances of the application that the reference application instance 200 is an instance of. The reference hash 171 may be updated when the security configuration 205 is changed.

Figure 5:
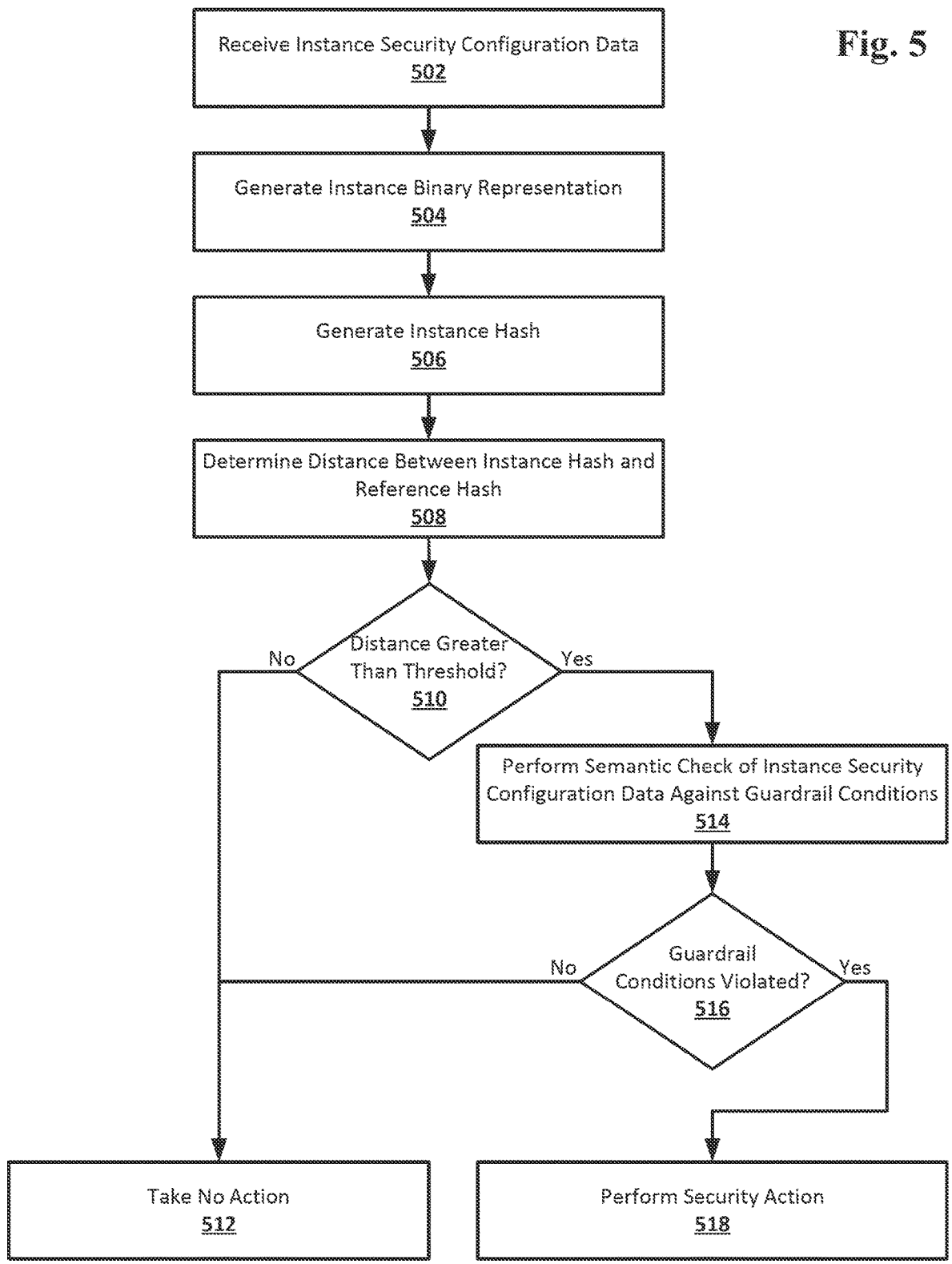
FIG. 5 shows an example procedure suitable for security configuration evaluation according to an implementation of the disclosed subject matter.

FIG. 5 shows an example procedure suitable for security configuration evaluation according to an implementation of the disclosed subject matter. At 502, instance security configuration data may be received. For example, data including the settings of the instance security configuration 305 may be received at the computing device 100 and stored as the instance security configuration data 162. The instance security configuration 305 may be a security configuration for the application instance 300, which may be an instance of the same application as the reference application instance 200. The settings included in the instance security configuration data 162 may include, for example, user and object permissions for the application instance 300.

At 504, an instance binary representation may be generated. For example, the binary representation generator 110 may generate the instance binary representation 164 from the instance security configuration data 162. The instance binary representation 164 may be generated in the same manner that the reference binary representation 163 was generated from the reference security configuration data 161, using the same binary conversion or encoding that was used on the reference security configuration data 161.

At 506, an instance hash may be generated. For example, the hash generator 120 may generate the instance hash 165 from the instance binary representation 164. The instance hash 165 may be generated in the same manner that the reference hash 171 was generated from the reference binary representation 163, using the same hashing algorithm. For example, if MinHash was used to generate the reference hash 171 from the reference binary representation 163, then MinHash may be used to generate the instance hash 165 from the instance binary representation 164.

At 508, a distance between the instance hash and a reference hash may be determined. For example, the hash comparator 130 may determine the distance between the instance hash 165 and the reference hash 171, as the reference hash 171 may be the reference hash for the application of which the application instance 300 is an instance. The distance between the instance hash 165 and the reference hash 171 may be determined in any suitable manner. For example, the distance may be determined as a Levenshtein distance, Hamming distance, or Euclidean distance.

At 510, if the distance is greater than a threshold, flow may proceed to 514 where a semantic check may be performed. Otherwise, flow may proceed to 512, where no action may be taken. For example, if the distance between the instance hash 165 and the reference hash 171 is greater than a threshold, the hash comparator 130 may generate a security determination indicating that the instance security configuration 305 is possibly insecure and may need further evaluation. If the distance is not greater than the threshold, the hash comparator 130 may generate a security determination indicating that the instance security configuration 305 is secure.

At 512, no action may be taken. For example, the hash comparator 130 may have generated a security determination indicating that the instance security configuration 305 is secure based on the distance between the instance hash 165 and the reference hash 171. The security system 150 may take no action, as the application instance 300 may be considered secure based on the instance security configuration 305. The instance security configuration 305 of the application instance 300 may be re-evaluated at any suitable time to ensure that it remains secure.

At 514, a semantic check of the instance security configuration may be performed against guardrail conditions. For example, the hash comparator 130 may have generated a security determination indicating that the instance security configuration 305 is possibly not secure based on the distance between the instance hash 165 and the reference hash 171. The instance security configuration data 162 may be checked against the guardrail conditions 166 by the semantic checker 140 to determine if the instance security configuration 305 violates any of the guardrail conditions 166. The semantic checker 140 may, for example, be any suitable SMT solver.

At 516, if any guardrail conditions are violated, flow may proceed to 518 where security actions may be performed. Otherwise, flow may proceed to 512, where no action may be taken. For example, if the semantic checker 140 determines, by checking the instance security configuration data 162 against the guardrail conditions 166, that the instance security configuration 305 violates any of the guardrail conditions 166, the semantic checker 140 may generate a security determination that the instance security configuration 305 is not secure. This may result in security actions being performed. If the semantic checker 140 determines that the instance security configuration 305 does not violate any of the guardrail conditions 166, no security actions may be needed, so no action may be taken.

At 518, a security action may be performed. For example, the semantic checker 140 may have determined that instance security configuration 305 violates any guardrail conditions 166 and generated a security determination that the instance security configuration 305 is not secure. The security system 150 may receive this security determination and may perform security actions. The security actions performed by the security system 150 may include, for example, notifying an appropriate entity associated with the application instance 300 that the instance security configuration 305, and application instance 300, is not secure. The notification may be sent using any suitable form of electronic communication. The security actions performed by the security system 150 may also include, for example, suspending user access to the application instance 300. Access to the application instance 300 may be suspended for all users of the application instance 300 until the instance security configuration 305 is updated, re-evaluated, and determined to be secure, for example, by the hash comparator 130 or the semantic checker 140, at which time the security system 150 may restore user access to the application instance 300.

Figure 6:
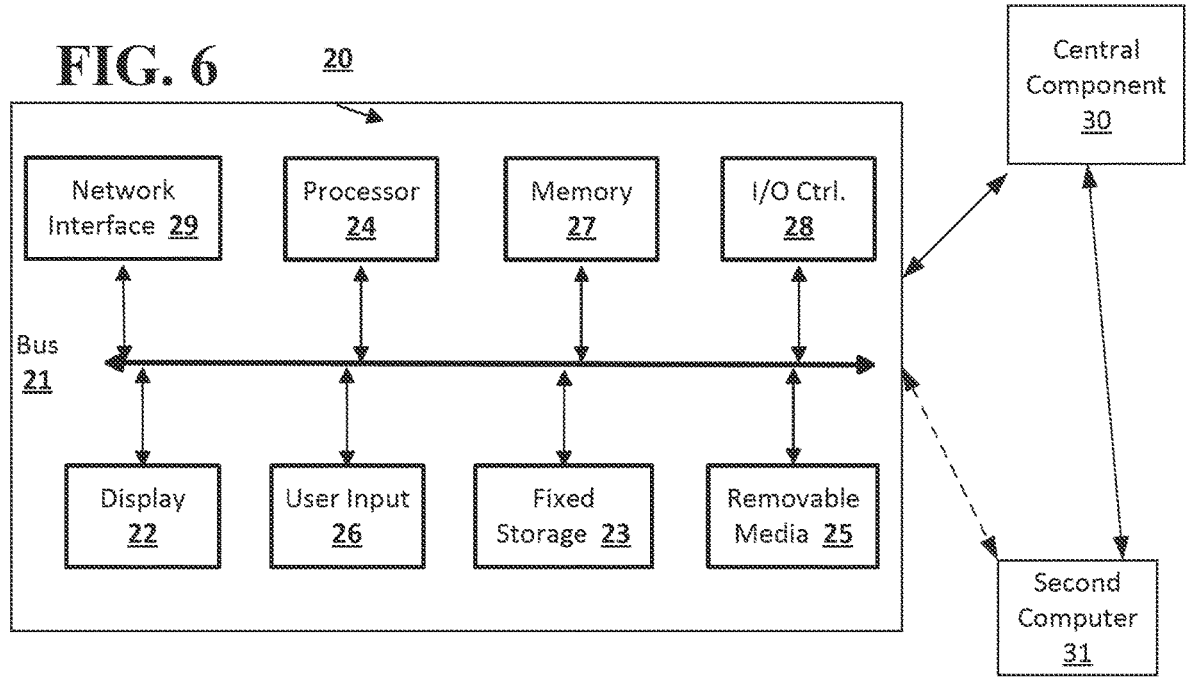
FIG. 6 shows a computer according to an implementation of the disclosed subject matter.

Implementations of the presently disclosed subject matter may be implemented in and used with a variety of component and network architectures. FIG. 6 is an example computer 20 suitable for implementing implementations of the presently disclosed subject matter. As discussed in further detail herein, the computer 20 may be a single computer in a network of multiple computers. As shown in FIG. 6, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with second computer 31. Alternatively, or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 7.

Many other devices or components (not shown) may be connected in a similar manner (e.g., document scanners, digital cameras and so on). Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

Figure 7:
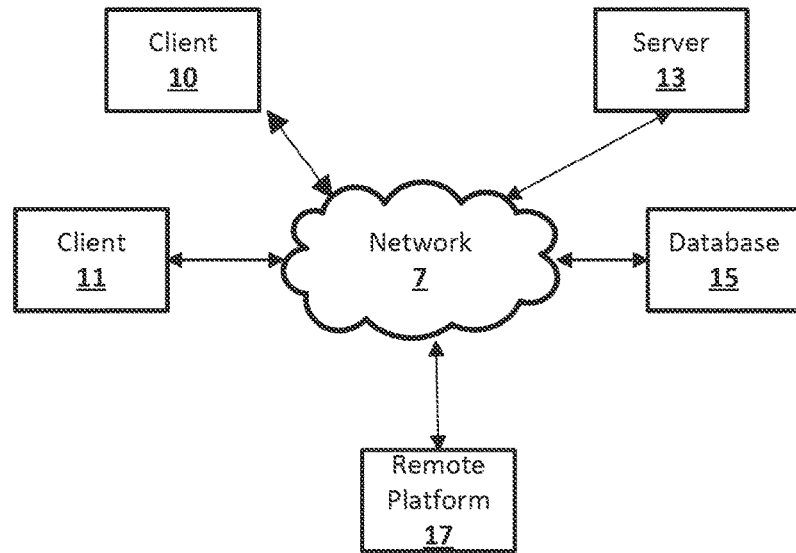
FIG. 7 shows a network configuration according to an implementation of the disclosed subject matter.

FIG. 7 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
   generating, at a computing device, a binary representation of a reference security configuration for an application;
   hashing, by the computing device, the binary representation of the reference security configuration for the application to generate a reference hash for the application;
   receiving, at the computing device, data for an instance security configuration for an instance of the application;
   generating, at the computing device, a binary representation of the instance security configuration from the received data for the instance security configuration;
   hashing, by the computing device, the binary representation of the instance security configuration to generate an instance hash; and
   determining, by the computing device, the distance between the reference hash and the instance hash, wherein the instance security configuration is determined to be secure if the distance is not greater than a threshold, and further comprising when the distance is greater than the threshold:
   performing, by the computing device, a semantic check of the instance security configuration against guardrail conditions,
   determining, by the computing device, that the semantic check indicates that the instance security configuration violates at least one of the guardrail conditions, and
   at least one of notifying, by the computing device, an organization associated with the instance of the application that the instance security configuration is insecure and suspending, by the computing device, user access to the instance of the application for users of the instance of the application.

2. The computer-implemented method of claim 1, wherein user access to the instance of the application was suspended, and further comprising:
receiving, at the computing device, data for the instance security configuration for the instance of the application, wherein the instance security configuration has been changed;
generating, at the computing device, a second binary representation of the instance security configuration from the received data for the instance security configuration;
hashing, by the computing device, the second binary representation of the instance security configuration to generate a second instance hash;
determining, by the computing device, the distance between the reference hash and the second instance hash;
if the distance between the reference hash and the second instance hash is not greater than the threshold, restoring, by the computing device, user access to the instance of the application, or
if the distance between the reference hash and the second instance hash is greater than a threshold:
performing, by the computing device, a semantic check of the instance security configuration against the guardrail conditions; and
if the semantic check indicates that the instance security configuration violates at least one of the guardrail conditions, maintaining, by the computing device, the suspended user access to the instance of the application, or,
if the semantic check indicates that the instance security configuration does not violate any of the guardrail conditions, restoring, by the computing device, user access to the instance of the application.

3. The computer-implemented method of claim 1, wherein the guardrail conditions comprise logical predicates.

4. The computer-implemented method of claim 1, wherein the computing device performs the semantic check using a Satisfiability Modulo Theories (SMT) solver.

5. The computer-implemented method of claim 1, wherein the reference security configuration for the application is a security configuration for a reference instance of the application.

6. The computer-implemented method of claim 1, wherein hashing, by the computing device, the binary representation of the reference security configuration for the application to generate a reference hash for the application and hashing, by the computing device, the binary representation of the instance security configuration to generate an instance hash use the same hashing algorithm.

7. A computer-implemented system comprising:
a hardware processor that generates a binary representation of a reference security configuration for an application,
hashes the binary representation of the reference security configuration for the application to generate a reference hash for the application,
receives data for an instance security configuration for an instance of the application,
generates a binary representation of the instance security configuration from the received data for the instance security configuration,
hashes the binary representation of the instance security configuration to generate an instance hash, and
determines the distance between the reference hash and the instance hash, wherein the instance security configuration is determined to be secure if the distance is not greater than a threshold and wherein the processor further when the distance is greater than the threshold, performs a semantic check of the instance security configuration against guardrail conditions,
determines that the semantic check indicates that the instance security configuration violates at least one of the guardrail conditions, and
at least one of notifies an organization associated with the of the application configuration that the instance security configuration is insecure and suspends user access to the instance of the application for users of the instance of the application.

8. The computer-implemented system of claim 7, wherein user access to the instance of the application was suspended, and wherein the hardware processor further receives data for the instance security configuration for the instance of the application, wherein the instance security configuration has been changed,
generates a second binary representation of the instance security configuration from the received data for the instance security configuration,
hashes the second binary representation of the instance security configuration to generate a second instance hash,
determines the distance between the reference hash and the second instance hash,
if the distance between the reference hash and the second instance hash is not greater than the threshold, restores user access to the instance of the application, or
if the distance between the reference hash and the second instance hash is greater than a threshold:
performs a semantic check of the instance security configuration against the guardrail conditions, and
if the semantic check indicates that the instance security configuration violates at least one of the guardrail conditions, maintains the suspended user access to the instance of the application, or,
if the semantic check indicates that the instance security configuration does not violate any of the guardrail conditions, restores user access to the instance of the application.

9. The computer-implemented system of claim 7 wherein the guardrail conditions comprise logical predicates.

10. The computer-implemented system of claim 7, wherein the hardware processor performs the semantic check using a Satisfiability Modulo Theories (SMT) solver.

11. The computer-implemented system of claim 7, wherein the reference security configuration for the application is a security configuration for a reference instance of the application.

12. The computer-implemented system of claim 7, wherein the hardware processor hashes the binary representation of the reference security configuration for the application to generate a reference hash for the application and hashes the binary representation of the instance security configuration to generate an instance hash using the same hashing algorithm.

13. A system comprising: one or more computers and one or more non-transitory storage devices storing instructions which are operable, when executed by the one or more computers, to cause the one or more computers to perform operations comprising:

generating a binary representation of a reference security configuration for an application;

hashing the binary representation of the reference security configuration for the application to generate a reference hash for the application;

receiving data for an instance security configuration for an instance of the application;

generating a binary representation of the instance security configuration from the received data for the instance security configuration;

hashing the binary representation of the instance security configuration to generate an instance hash; and determining the distance between the reference hash and the instance hash, wherein the instance security configuration is determined to be secure if the distance is not greater than a threshold and when the distance is greater than the threshold:

performing a semantic check of the instance security configuration against guardrail conditions, determining that the semantic check indicates that the instance security configuration violates at least one of the guardrail conditions, and at least one of notifying an organization associated with the instance of the application that the instance security configuration is insecure and suspending user access to the instance of the application for users of the instance of the application.

14. The system of claim 13, wherein user access to the instance of the application was suspended, and wherein the one or more computers and one or more non-transitory storage devices further store instructions which are operable, when executed by the one or more computers, to cause the one or more computers to perform operations comprising:

receiving data for the instance security configuration for the instance of the application, wherein the instance security configuration has been changed;

generating a second binary representation of the instance security configuration from the received data for the instance security configuration;

hashing the second binary representation of the instance security configuration to generate a second instance hash;

determining, the distance between the reference hash and the second instance hash;

if the distance between the reference hash and the second instance hash is not greater than the threshold, restoring, by the computing device, user access to the instance of the application, or if the distance between the reference hash and the second instance hash is greater than a threshold:

performing a semantic check of the instance security configuration against the guardrail conditions; and if the semantic check indicates that the instance security configuration violates at least one of the guardrail conditions, maintaining the suspended user access to the instance of the application, or, if the semantic check indicates that the instance security configuration does not violate any of the guardrail conditions, restoring user access to the instance of the application.

15. The system of claim 13, wherein the guardrail conditions comprise logical predicates.

16. The system of claim 13, wherein the computing device performs the semantic check using a Satisfiability Modulo Theories (SMT) solver.

17. The system of claim 13, wherein the reference security configuration for the application is a security configuration for a reference instance of the application.

* * * * *